(12) United States Patent  
Chi et al.

(10) Patent No.: US 9,111,232 B2
(45) Date of Patent: Aug. 18, 2015

(54) PORTABLE WORKLOAD PERFORMANCE PREDICTION FOR THE CLOUD

(71) Applicants: Yun Chi, Monte Sereno, CA (US); Vahit Hakan Hacigumus, San Jose, CA (US); Jenny Duggan, Boston, MA (US); Shenghuo Zhu, Santa Clara, CA (US)

(72) Inventors: Yun Chi, Monte Sereno, CA (US); Vahit Hakan Hacigumus, San Jose, CA (US); Jenny Duggan, Boston, MA (US); Shenghuo Zhu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 308 days.

(21) Appl. No.: 13/874,769

(22) Filed: May 1, 2013

(65) Prior Publication Data

US 2014/0122387 A1 May 1, 2014

Related U.S. Application Data

(60) Provisional application No. 61/720,990, filed on Oct. 31, 2012.

(51) Int. Cl.
*G06F 15/18* (2006.01)
*G06N 99/00* (2010.01)
*G06N 5/04* (2006.01)

(52) U.S. Cl.
CPC ............. *G06N 99/005* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 2002/0161664 A1* | 10/2002 | Shaya et al. | 705/26 |
| 2010/0082602 A1* | 4/2010 | Ganapathi et al. | 707/718 |
| 2010/0114865 A1* | 5/2010 | Gupta et al. | 707/713 |
| 2012/0089552 A1* | 4/2012 | Chang et al. | 706/52 |
| 2013/0185433 A1* | 7/2013 | Zhu et al. | 709/226 |
| 2014/0089509 A1* | 3/2014 | Akolkar et al. | 709/226 |

\* cited by examiner

*Primary Examiner* — Kakali Chaki
*Assistant Examiner* — Mai T Tran
(74) *Attorney, Agent, or Firm* — Joseph Kolodka

(57) ABSTRACT

Systems and methods are disclosed to perform performance prediction for cloud-based databases by building on a computer a cloud database performance model using a set of training workloads; and using a learned model on the computer to predict database performance in the cloud for a new workload, wherein for each reference workload r and hardware configuration h, system throughput $t_{r,h}$, average throughput of $\alpha_r$ and standard deviation $\sigma_r$, comprising normalizing each throughput as:

$$\overline{t_{r,h}} = \frac{t_{r,h} - a_r}{\sigma_r}.$$

19 Claims, 5 Drawing Sheets

PORTABLE WORKLOAD PERFORMANCE PREDICTION FOR THE CLOUD

This application is a continuation of Provisional Application Ser. No. 61/720,990 filed on Oct. 31, 2012, the content of which is incorporated by reference.

BACKGROUND

The present invention relates to portable workload performance prediction for the cloud.

Offerings for DBMS users now come in a variety of hardware and pricing schemes. Users can purchase traditional data centers, subdivide hardware into virtual machines or outsource all of their work to one of many of cloud providers. Each of these options is attractive for different use cases. The infrastructure-as-a-service (IaaS) has grown in popularity, in which users rent virtual machines, usually by the hour. Major cloud providers in this space include Amazon Web Services and Rackspace. It is well known that by deploying in the cloud, users can save significantly in terms of upfront infrastructure and maintenance costs. They benefit from elasticity in resource availability by scaling dynamically to meet demand.

Past work in performance prediction revolved around working with a diverse set of queries, which typically originate from the same schema and database. These studies relied on either parsing query execution plans to create comparisons to other queries or learning models in which they compared hardware usage patterns of new queries to those of known queries. These techniques are not designed to perform predictions across platforms; they do not include predictive features characterizing the execution environment. Thus, they require extensive re-training for each new hardware configuration.

SUMMARY

In one aspect, a method is disclosed to perform performance prediction for cloud-based databases by building on a computer a cloud database performance model using a set of training workloads; and using the learned model on the computer to predict database performance in the cloud for a new workload.

Implementations of the above aspect can include one or more of the following. The method includes improving the performance model using data from a newly deployed workload by incorporating performance of the new workload and true performance in the real cloud server. The method also includes deploying each training workload on a test server only once. The method further includes applying one or more resource spoilers to control available resources for deployed workloads at a test server. The method can process metrics including query latency and query throughput. The system can deploy the workload into a cloud server to collect actual performance. The method includes building a model using machine learning and collaborative filtering that maps a test server performance on a workload to corresponding performance in the cloud. The method can iteratively execute the workload under a set of configurations with different resource constraints. A learning method can be used to iteratively choose the next configuration to use to reveal information based on prior learning. Criteria can be used to stop training based on a prediction confidence threshold or a running budget.

Advantages of the system may include one or more of the following. Having a prediction framework that is applicable across hardware platforms can significantly ease the provisioning problem for portable databases. By modeling how a workload will react to changes in resource availability, users can make informed purchasing decisions and providers can better meet their users' expectations. Hence, the framework would be useful for the parties who make the decisions on hardware configurations for database workloads. The system generalizes workload performance prediction to portable databases, which are intended to be used on multiple platforms, either on physical or virtual hardware. These databases may execute queries at a variety of price points and service levels, potentially on different cloud providers. In addition to modeling the workload based on local samples, the system may learn from samples in the cloud. By extrapolating on what is learned from one cloud provider the system can create a feedback loop where another realizes improvements in its prediction quality. The framework requires little knowledge about the specific details of the workloads and the underlying hardware configurations. The core element is an identifier, called fingerprint, which is created for each workload examined in the framework. A fingerprint abstractly characterizes a workload on carefully selected, simulated hardware configurations. Once it is defined, a fingerprint would describe the workload under varying hardware configurations, including the ones from different cloud providers. Fingerprints are also used to quantify the similarities among workloads. Fingerprints are used as input to a collaborative filtering-style algorithm to make predictions about new workloads.

DESCRIPTION

Figure 1:
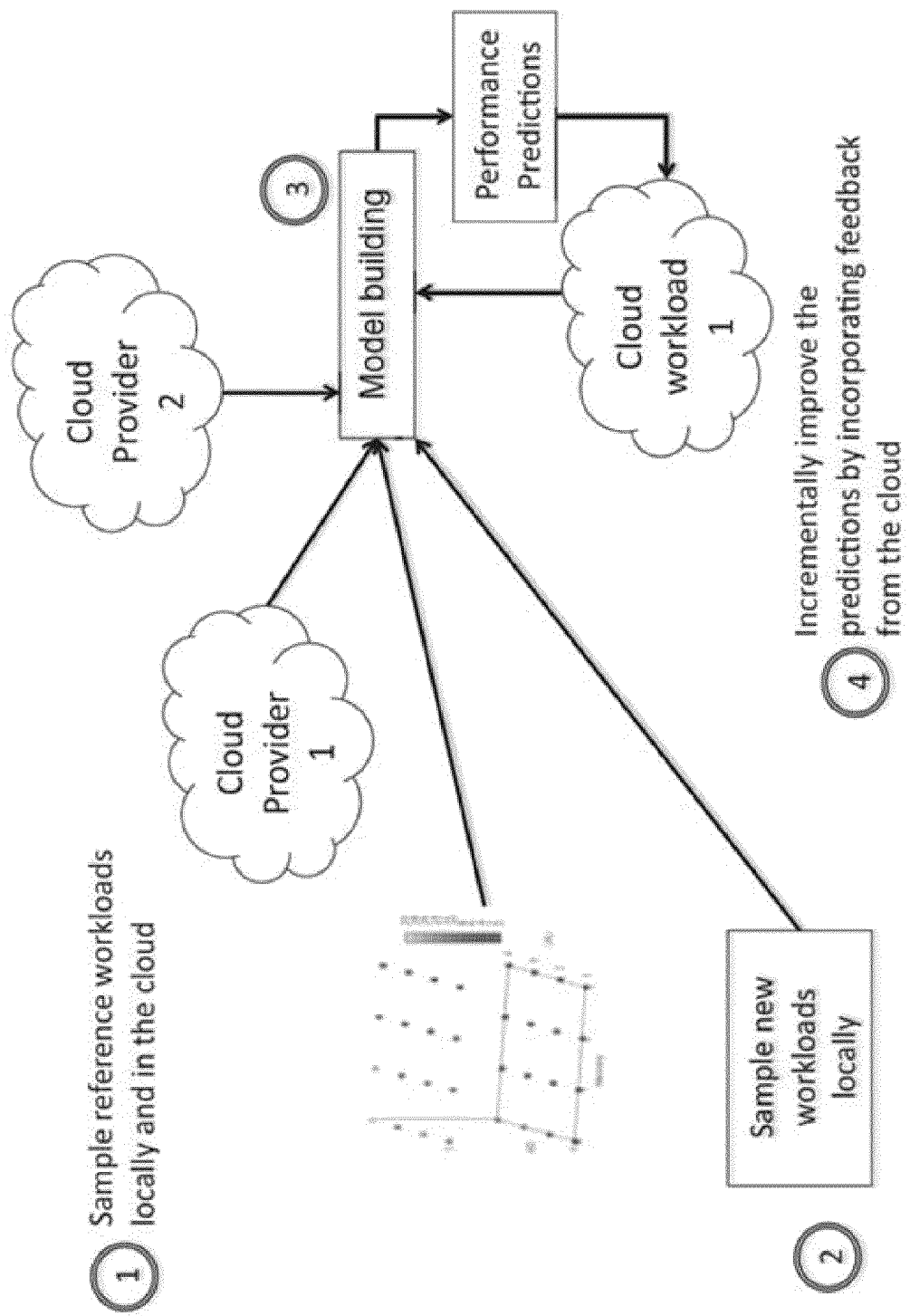
FIG. 1 shows an exemplary system for modeling and predicting workload throughput.

FIG. 1 shows an exemplary system for modeling and predicting workload throughput. The system receives sample reference workloads locally and in the cloud from various cloud providers (1). Next, the system sample new workloads locally (2). A model is built on a computer (3) that generates performance predictions for a particular cloud workload. The system incrementally improves the prediction by incorporating feedback from the cloud and local database machines (4).

The framework consists of several modules as outlined in FIG. 1. First, the model is trained using a variety of reference workloads, called training workloads. Next, the process executes limited sampling on a new workload on the local testbed. After that the system compares the new workload to the references and creates a model for it. Finally, the system leverages the model to create workload throughput predictions (i.e., Queries per Minute or QpM). Optionally the system can use a feedback loop to update the predictions as more execution samples become available from the new workloads.

The system initially samples the execution of known workloads using an experimental configuration. Essentially, a new workload consists of a collection of queries that the user would like to understand the performance of on different hardware configurations. The system samples these workloads under many simulated hardware configurations and generates a three-dimensional local response surface. This surface, which is part of the workload fingerprint, characterizes how the workload responds to changing I/O, CPU and memory availability.

In addition, the system evaluates each of the reference workloads in the cloud. The framework seamlessly considers multiple cloud providers, regarding each cloud offering as a distinct hardware platform. By quantifying how these remote response surfaces varied, the system determines common behavioral patterns for analytical workloads in the cloud. The system learns from the reference workloads' performance in the cloud rather than interpolating within the local testbed. This learning approach makes the framework robust to hardware platforms that exceed the local capacity.

Next the system samples new workloads that are disjoint from the training set. The system locally simulates a representative set of hardware configurations for the new workloads, creating local response surface. Finally the system creates predictions for new workloads on remote platforms by comparing their response surface to that of the reference workloads. In addition the system incrementally improves the model for new workloads by adding in-cloud performance to its fingerprint. As the system refines the fingerprint for the workload, the system can create higher quality predictions for new, unsampled platforms.

In the design, the system creates a simple framework for simulating hardware configurations for each workload using a local testbed. When the system evaluates the new queries locally the system obviates the noisiness that may be caused by virtualization and multi-tenancy. The hardware simulation system is called a spoiler because it occupies resources that would otherwise be available to the workload. The spoiler manipulates resource availability on three dimensions: CPU time, I/O bandwidth and memory. The system considers the local response surface to be an inexpensive surrogate for cloud performance.

Figure 2:
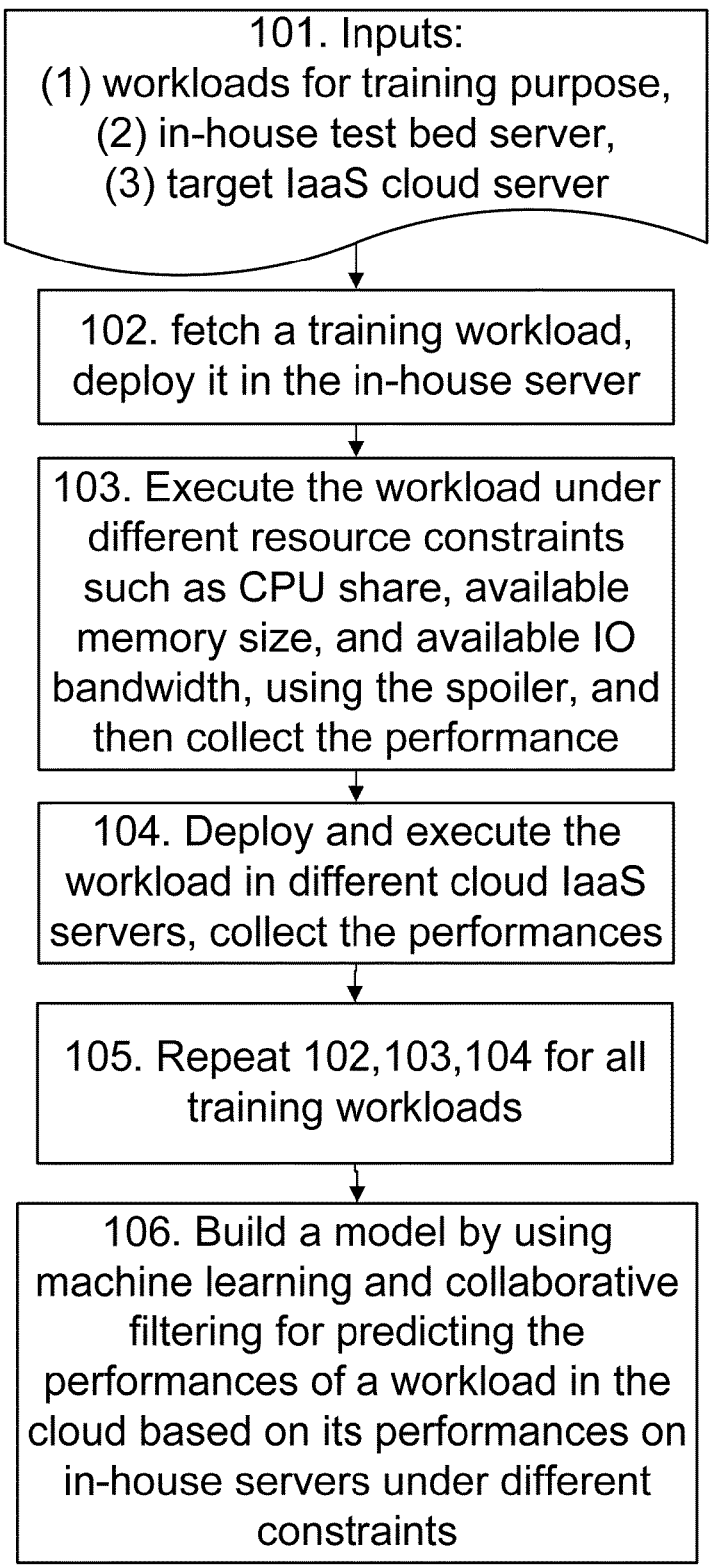
FIG. 2 shows an exemplary process for learning workload behavior.

FIG. 2 shows an exemplary process for learning workload behavior. The process receives inputs in 101 that includes workloads for training purpose. The workload input can come from an in-house server or from a third party IaaS server. In 102, the process fetches a training workload and deploy the test workload in the local server. In 103, the server executes the workload under different resource constraints such as CPU share, memory size, and IO bandwidth, and tests using the spoiler and collects performance data. In 104, the server deploys and executes the workload in different cloud IaaS servers and collect performance data. In 105, the process repeats 102-104 for all training workloads. In 106, the process builds a model using machine learning and collaborative filtering for predicting the performance of the cloud system based on in-house servers under different constraints.

Figure 3:
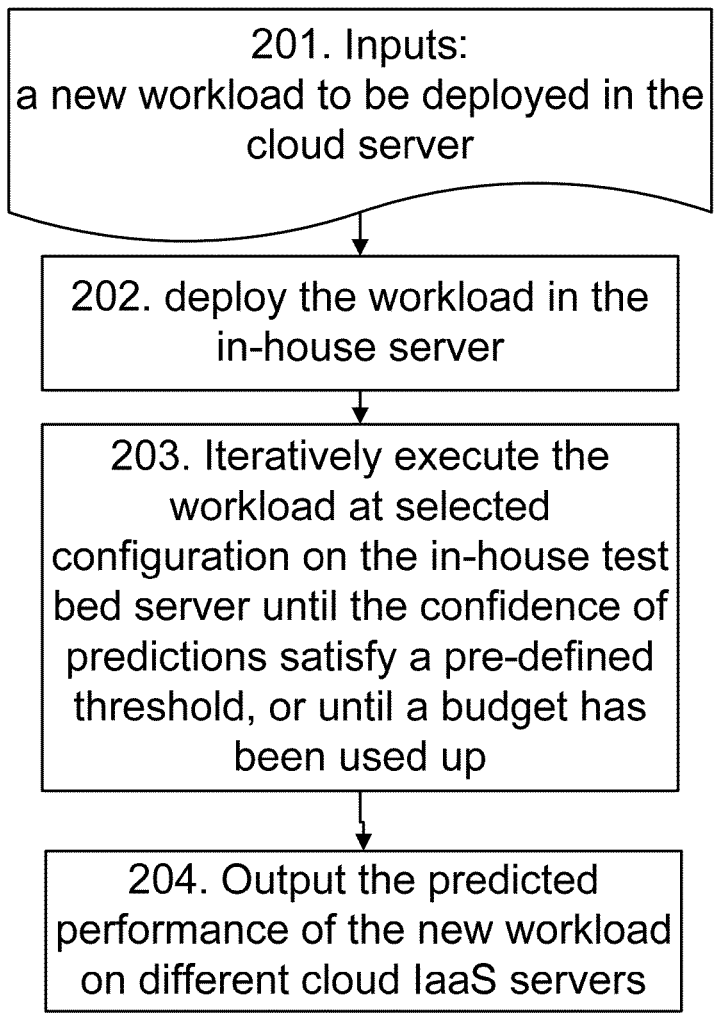
FIG. 3 shows an exemplary testing operation.

FIG. 3 shows an exemplary testing operation process. The process receives as inputs a new workload to be deployed in the cloud server in 201. Next, in 202, the process deploys the workload on the in-house server. In 203, the process iteratively executes the workload using selected configurations from the in-house server until the confidence of prediction reaches a predefined threshold, or until a budget for running the testing operation is used up. In 204, the process generates the predicted performance of the new workload on the different clout IaaS servers.

The workload can be experimented on by slicing this three dimensional response surface along several planes. In doing so, the system identifies the resources upon which the workload is most reliant. Not surprisingly, the I/O bandwidth was the dominant factor in many cases, followed by the memory availability.

The system controls the memory dimension by selectively taking away portions of the RAM. This is done by allocating the space in the spoiler and pinning it in memory. This forced the query to swap if it needed more than the available RAM. In the case the system starts with 4 gigabytes of memory and increment in steps of four until it reaches the maximum of 16 gigabytes.

The system regulates the CPU dimension by taking a percent of the CPU to make available to the database. For simplicity the system sets the number of cores equal to the multiprogramming level (MPL). Hence each query had access to a single core. Simulations of the system having access to 25%, 50%, 75% and 100% of the CPU time has been done by making a top priority process that executes a large number of floating point operations and timing the duration of the arithmetic and sleep for the appropriate ratio of CPU time.

The system has a coarse-grained metric for I/O availability: low or high. Most cloud providers have few levels of quality of service for their I/O time. Some cloud service providers, such as Amazon Web Services, have started offering their users to provision I/Os per second as a premium option. The system simulated this by making the high availability give the database unimpeded access to I/O bandwidth. For the low I/O bandwidth case the system had a competing process that circularly scanned a very large file at equal priority to the workload.

Figure 5:
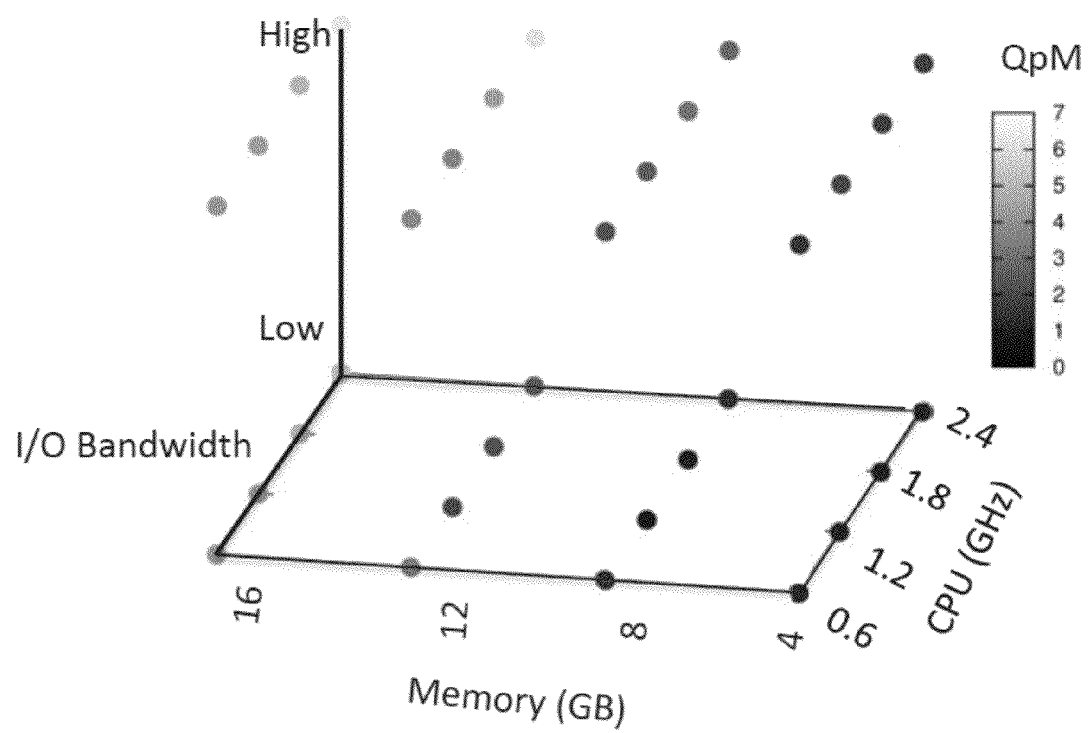
FIG. 5 shows an exemplary local response surface.

An example local response surface is depicted in FIG. 5. The system determines that its throughput varies from one to seven QpM. This workload's throughput exhibits a strong correlation with memory availability. Most contention was in the I/O subsystem both through scanning tables and through swapping intermediate results as memory becomes less plentiful.

A prediction framework inspired by memory-based version of collaborative filtering is used to model the workloads. This approach is typically used in recommender systems. In simplified terms, collaborative filtering identifies similar objects, compares them and makes predictions about their future behavior. This part of the framework is labelled as "model building" in FIG. 1.

One popular application for collaborative filtering is movie recommendations, which the system shortly review as an analogous exercise. When a viewer v asks for a movie recommendation from a site such as Netflix, the service would first try to identify similar users. It would then average the scores that similar viewers had for movies that v has not seen yet to project ratings for v. It can then rank the projected ratings and return the top-k to v.

In the case, the system forecasts QpM for a new workload. The system determines the similarity for the new workload to that of the references. The system then calculates a weighted average of their outcomes for the target cloud platform based on similarity. The system can achieve high quality predictions with little training on new workloads.

One implementation first normalizes each reference workload to make it comparable to others. the system zero mean its throughputs and divide by the standard deviation. This enables us to account for different workloads having distinct scales in QpM. For each reference workload r and hardware configuration h, the system has a throughput $t_{r,h}$. The system has an average throughput of $a_r$ and a standard deviation $\sigma_r$. the system normalizes each throughput as:

$$\overline{t_{r,h}} = \frac{t_{r,h} - a_r}{\sigma_r}$$

This puts the throughputs on a scale of approximately $-1 \ldots 1$. the system apply this Gaussian normalization once per workload. This makes one workload comparable to the others.

When the system receives a new workload i, for which the system is creating a prediction, the system normalizes it similarly and then compares it to all of the reference workloads. For i the system has samples of it executing on a set of hardware configurations $H_i$. Sampling strategies are discussed in the next section. For each pair of workloads i, j the system computes $S_{i,j}=H_i \cap H_j$ or the hardware configurations on which both have executed. The system can then estimate the similarity between i and j as:

$$w_{i,j} = \frac{1}{|S_{i,j}|} \sum_{h \in S_{i,j}} \overline{t_{i,h}} \overline{t_{j,h}}$$

The above weight $w_{i,j}$ approximates the Pearson similarity between the normalized performance of workload i and that of workload j. After that the system forecasts the workload's QpM on a new hardware platform, h, by taking a similarity-based weighted average of their normalized throughputs:

$$\overline{t_{i,h}} = \frac{\sum_{j|j \in S_{i,j}, j \neq \phi, h \in H_j} w_{i,j} \overline{t_{j,h}}}{\sum_{j|j \in S_{i,j}, j \neq \phi, h \in H_j} |w_{i,j}|}$$

This forecasting favors workloads that most closely resemble the one for which the system is creating a prediction. The system deemphasizes those that are less relevant to the forecasts.

Naturally the system can only take this weighted average for the workloads that have trained on h, the platform the system is modeling. The system can create predictions for both local and in-cloud platforms using this technique. While the system benefits if the local test bed physically has more resources than the cloud-based platforms upon which the system predicts, the system can use the model for cloud platforms exceeding the local capabilities. The only requirement to create a prediction is that the system has data capturing how training workloads respond to each remote platform. Experimentally the system evaluates cloud platforms that are both greater and less than the local testbed in hardware capacity.

The unnormalized throughput is determined as:

$$t_{i,h} = \overline{t_{i,h}} \sigma_i + a_i$$

This is the final prediction.

Two sampling strategies can be used for exploring a workload's response surface. The system first considers Latin hypercube sampling, a technique that randomly selects a subsection of the available space with predictable distributions. The system also evaluates adaptive sampling, in which the system recursively subdivide the space to characterize the novel parts of the response surface.

Latin hypercube sampling is a popular way to characterize a surface by taking random samples from it. It takes samples such that each plane in the space is intersected exactly once, as depicted in Table 1, which is an example of 2-D Latin hypercube sampling.

| Query | 1 | 2 | 3 | 4 | 5 |
|---|---|---|---|---|---|
| 1 | X | | | | |
| 2 | | | | | X |
| 3 | | X | | | |
| 4 | | | | X | |
| 5 | | | | X | |

-continued

| Query | 1 | 2 | 3 | 4 | 5 |
|---|---|---|---|---|---|
| 3 | X | | | | |
| 4 | | | X | | |
| 5 | | | | X | |

In one embodiment, the system first partitions the response surface by I/O bandwidth, a dimension that has exactly two values for the configuration. The dimensions are all of uniform size to adhere to the requirement that each plane is sampled exactly once. The system then has two 4×4 planes and the system sample each four times at random.

In one embodiment that performs adaptive sampling, the system assumes that the local response surface is monotonic. This is intuitive; the more resources a workload has, the faster it will complete. To build a collaborative filtering model the system needs to determine its distribution of throughputs. Exhaustively evaluating this continuous surface is not practical. By exploiting the clear relationship between hardware capacity and performance, the system may reduce the sampling requirements.

Hence the system uses an adaptive sampling of the space. The system starts by sampling the extreme points of the local response surface. The system first tests to see if the range established by these points is significant. If it is very small, then the system stops. Otherwise the system recursively subdivides the space until the system have a well-defined model. The space is sub-divided until the system observes that the change in throughput is ≤n % of the response surface range. The recursive exploration of the space first divides the response surface by I/O bandwidth because I/O bandwidth is the dimension most strongly correlated with throughput. After that the system subdivides on memory availability which also directly impacts the I/O bottleneck. Finally the system samples among changing CPU resources if the system have not reached a stopping condition.

Figure 4:
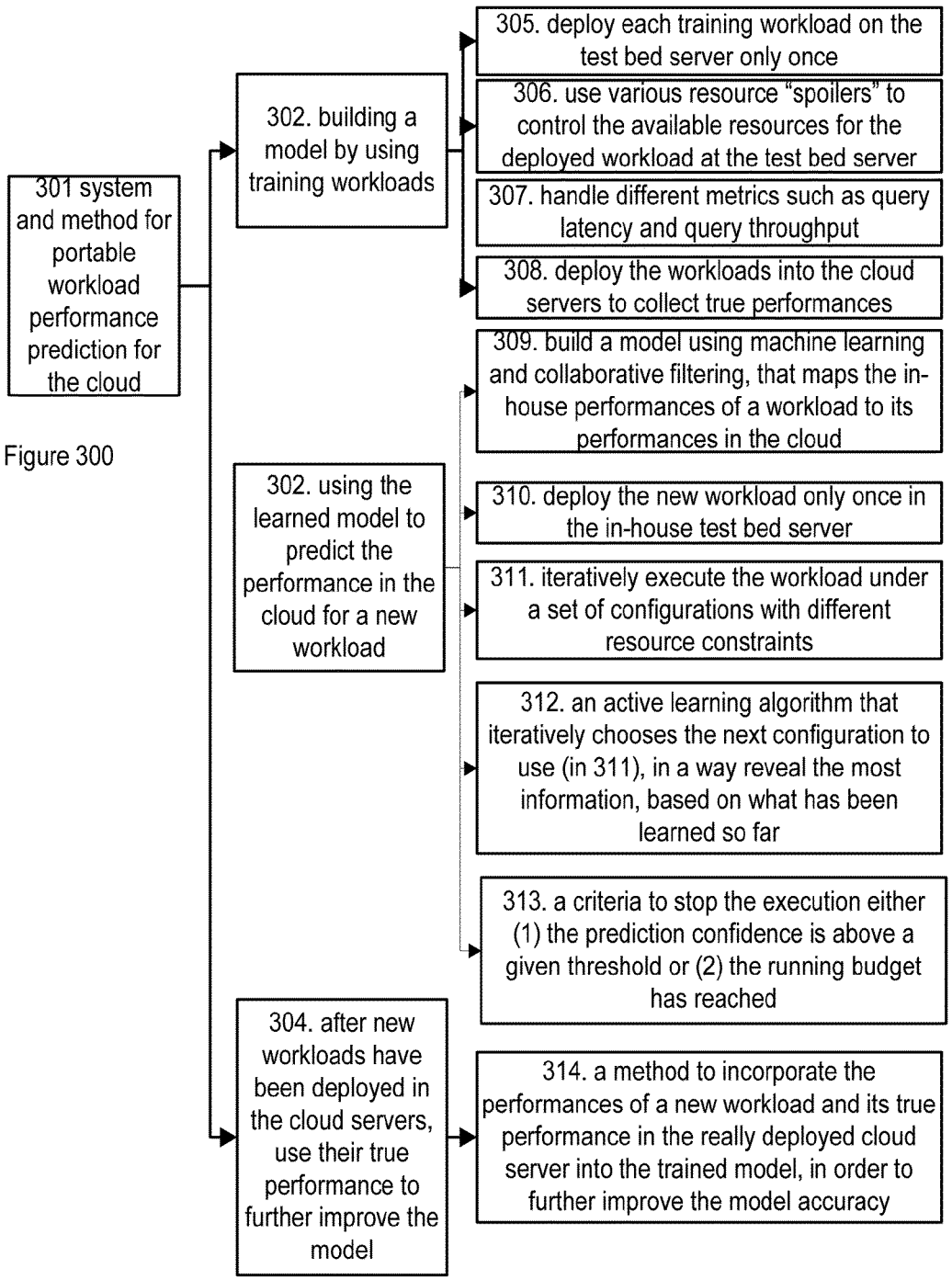
FIG. 4 shows an exemplary process for modeling and predicting workload throughput.

FIG. 4 shows an exemplary method to perform performance prediction for cloud-based databases 301 that includes building a cloud database performance model using one or more training workloads; and using the learned model to predict database performance in the cloud for a new workload (302). The method includes improving the performance model (304) using data from a newly deployed workload by incorporating performance of the new workload and true performance in the real cloud server (314). The method also includes deploying each training workload on a test server only once (305). The method further includes applying one or more resource spoilers to control available resources for deployed workloads at a test server (306). The method can process metrics including query latency and query throughput (307). The system can deploy the workload into a cloud server to collect actual performance (308). The method includes building a model using machine learning and collaborative filtering that maps a test server performance on a workload to corresponding performance in the cloud (309). The method can iteratively execute the workload under a set of configurations with different resource constraints (311). A learning method can be used to iteratively choose the next configuration to use to reveal information based on prior learning (312). Criteria can be used to stop training based on a prediction confidence threshold or a running budget (312).

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to perform performance prediction for cloud-based databases, comprising:
    building on a computer a cloud database performance model using a set of training workloads; and
    using a learned model on the computer to predict database performance in the cloud for a new workload,
wherein for each reference workload r and hardware configuration h, system throughput $t_{r,h}$, average throughput of $\alpha_r$ and standard deviation $\sigma_r$, comprising normalizing each throughput as:

$$\overline{t_{r,h}} = \frac{t_{r,h} - a_r}{\sigma_r}.$$

2. The method of claim 1, comprising improving the performance model using data from a newly deployed workload by incorporating new workload and true performance data in a cloud server.

3. The method of claim 1, comprising deploying each training workload on a test server only once.

4. The method of claim 1, comprising applying one or more resource spoilers to control available resources for deployed workloads at a test server.

5. The method of claim 1, comprising processing metrics including query latency and query throughput.

6. The method of claim 1, comprising deploying the workload into a cloud server to collect actual performance.

7. The method of claim 1, comprising building a model using machine learning and collaborative filtering that maps a test server performance on a workload to corresponding performance in the cloud.

8. The method of claim 1, comprising iteratively executing the workload under a set of configurations with different resource constraints.

9. The method of claim 1, comprising applying a learning method that iteratively chooses the next configuration to use to reveal information based on prior learning.

10. The method of claim 1, comprising applying a criteria to stop training based on a prediction confidence threshold or a running budget.

11. The method of claim 1, comprising estimating a similarity between i and j as:

$$w_{i,j} = \frac{1}{|S_{i,j}|} \sum_{h \in S_{i,j}} \overline{t_{i,h} t_{j,h}}$$

where weight $w_{i,j}$ approximates a Pearson similarity between a normalized performance of workload i and workload j.

12. The method of claim 1, comprising forecasting a workload's QpM on a new hardware platform, h, by taking a similarity-based weighted average of normalized throughputs:

$$\overline{t_{i,h}} = \frac{\sum_{j | j \in S_{i,j} \neq \phi, h \in H_j} w_{i,j} \overline{t_{j,h}}}{\sum_{j | j \in S_{i,j} \neq \phi, h \in H_j} |w_{i,j}|}.$$

13. A system to perform performance prediction for cloud-based databases, comprising:
    a test computer to locally collect database performance data;
    one or more cloud servers to run cloud databases;
    computer code for building on a computer a cloud database performance model using one or more training workloads; and
    computer code for using a learned model on the computer to predict database performance in the cloud for a new workload,
wherein for each reference workload r and hardware configuration h, system throughput $_{r,h}$, average throughput of $\alpha_r$ and standard deviation $\sigma_r$, comprising normalizing each throughput as:

$$\overline{t_{r,h}} = \frac{t_{r,h} - a_r}{\sigma_r}.$$

14. The system of claim 13, comprising code for improving the performance model using data from a newly deployed workload by incorporating new workload and true performance data in a cloud server.

15. The system of claim 13, comprising code for deploying each training workload on a test server only once.

16. The system of claim 13, comprising code for applying one or more resource spoilers to control available resources for deployed workloads at a test server.

17. The system of claim 13, comprising code for processing metrics including query latency and query throughput.

18. The system of claim 13, comprising code for estimating a similarity between i and j as:

$$w_{i,j} = \frac{1}{|S_{i,j}|} \sum_{h \in S_{i,j}} \overline{t_{i,h} t_{j,h}}$$

where weight $w_{i,j}$ approximates a Pearson similarity between a normalized performance of workload i and workload j.

19. The system of claim 13, comprising code for forecasting a workload's QpM on a new hardware platform, h, by taking a similarity-based weighted average of normalized throughputs:

$$\overline{t_{i,h}} = \frac{\sum_{j|j \in S_{i,j} \neq \phi, h \in H_j} w_{i,j} t_{j,h}}{\sum_{j|j \in S_{i,j} \neq \phi, h \in H_j} |w_{i,j}|}.$$

* * * * *